United States Patent
Liu et al.

(10) Patent No.: US 8,104,388 B2
(45) Date of Patent: Jan. 31, 2012

(54) WORKPIECE FEEDING DEVICE WITH ANGLE DETECTION MEANS FOR SAW MACHINE

(75) Inventors: Hsuan-Chu Liu, Taichung County (TW); Belle Chang, Changhua County (TW)

(73) Assignee: OAV Equipment and Tools, Inc., Taichung (TW)

(*) Notice: Subject to any disclaimer, the term of this patent is extended or adjusted under 35 U.S.C. 154(b) by 544 days.

(21) Appl. No.: 12/325,108

(22) Filed: Nov. 28, 2008

(65) Prior Publication Data

US 2009/0223340 A1    Sep. 10, 2009

(30) Foreign Application Priority Data

Mar. 7, 2008    (TW) .................................. 97203973

(51) Int. Cl.
*B27B 27/06*    (2006.01)
(52) U.S. Cl. ................. 83/471.3; 83/435.11; 83/435.14; 83/468.3
(58) Field of Classification Search ............... 83/435.11, 83/471.3, 435.14, 581, 468.3, 468, 468.7, 83/522.18, 438, 69, 8.21; 33/471, 469
See application file for complete search history.

(56) References Cited

U.S. PATENT DOCUMENTS

| | | | | |
|---|---|---|---|---|
| 2,651,337 | A | * | 9/1953 | Pollak .............................. 83/438 |
| 4,455,907 | A | * | 6/1984 | Bassett ........................... 83/438 |
| 5,201,863 | A | * | 4/1993 | Peot ................................ 83/432 |
| 5,379,669 | A | * | 1/1995 | Roedig ............................ 83/421 |
| 5,936,398 | A | * | 8/1999 | Bellefeuille ................... 324/206 |
| 2004/0099115 | A1 | * | 5/2004 | Salazar ...................... 83/435.14 |
| 2004/0139619 | A1 | * | 7/2004 | Tateishi et al. ................. 33/1 PT |
| 2006/0248998 | A1 | * | 11/2006 | Duginske ........................ 83/468 |

* cited by examiner

*Primary Examiner* — Ghassem Alie
(74) *Attorney, Agent, or Firm* — Browdy and Neimark, PLLC

(57) ABSTRACT

A workpiece feeding device used in a saw machine is disclosed to include a carrier having a base frame movably mounted on the machine base of the saw machine and an angle scale fastened to the base frame, a fence unit having a rip fence pivotally mounted on the base frame of the carrier and biasable relative to the angle scale, a magnetic plate assembly mounted on the base frame of the carrier and carrying a magnetic strip, and a magnetic sensor mounted in the fence unit and movable with the fence unit to measure the biasing angle of the fence unit relative to the angle scale subject to change of magnetic induction between the magnetic sensor and the magnetic strip.

7 Claims, 6 Drawing Sheets

WORKPIECE FEEDING DEVICE WITH ANGLE DETECTION MEANS FOR SAW MACHINE

BACKGROUND OF THE INVENTION

1. Field of the Invention

The present invention relates to saw machines and more particularly, to a workpiece feeding device for saw machines that has angle detection means to detect the cutting angle.

2. Description of the Related Art

A conventional table saw is known comprising a machine base, a saw blade holder mounted on the machine base and holding a saw blade and a motor, a horizontal displacement mechanism mounted on the machine base and movable horizontally relative to the machine base and the saw blade holder, an angle adjustment device provided at the horizontal displacement mechanism and adapted for adjusting the cutting angle of the workpiece relative to the saw blade, and an angle scale located on the angle adjustment device for enabling the user to read the cutting angle. When the user is operating the table saw to cut a wooden workpiece, the user can adjust and set the biasing angle subject to the angle scale at the angle adjustment device and subject to the desired shape and size, obtaining the desired cutting angle of the workpiece relative to the saw blade.

However, the angle scale of the aforesaid table saw is a simple rule, and the user must read the readings of the angle scale with the eyes. During cutting, the angle scale may be covered by the cut chips. At this time, the user must clean the angle scale. Further, the graduations may become vague after a long use of the table saw. Further, due to the limitation of the graduations of the angle scale, the angle scale cannot satisfy a precision requirement for fine cutting. Therefore, an improvement in this regard is necessary.

SUMMARY OF THE INVENTION

The present invention has been accomplished under the circumstances in view. It is the main object of the present invention to provide a workpiece feeding device for saw machine, which directly indicates the cutting angle for reading by the user to facilitate sawing operation.

To achieve this and other objects of the present invention, the workpiece feeding device is used in a saw machine comprising a machine base and a saw blade. The workpiece feeding device comprises a carrier, which comprises a base frame provided at one side of the machine base of the saw and movable relative to the machine base and an angle scale fastened to the base frame. a fence unit, which comprises a rip fence pivotally mounted on the base frame of the carrier and biasable relative to the angle scale, a magnetic plate assembly mounted on the base frame of the carrier and carrying a magnetic strip, and a magnetic sensor mounted in the fence unit and spaced from said magnetic strip of the magnetic plate assembly at a predetermined distance. The magnetic sensor is movable with the fence unit to change the angular position thereof relative to the magnetic plate assembly and to measure the biasing angle of the fence unit relative to the angle scale subject to change of magnetic induction between the magnetic sensor and the magnetic strip.

DETAILED DESCRIPTION OF THE INVENTION

Figure 1:
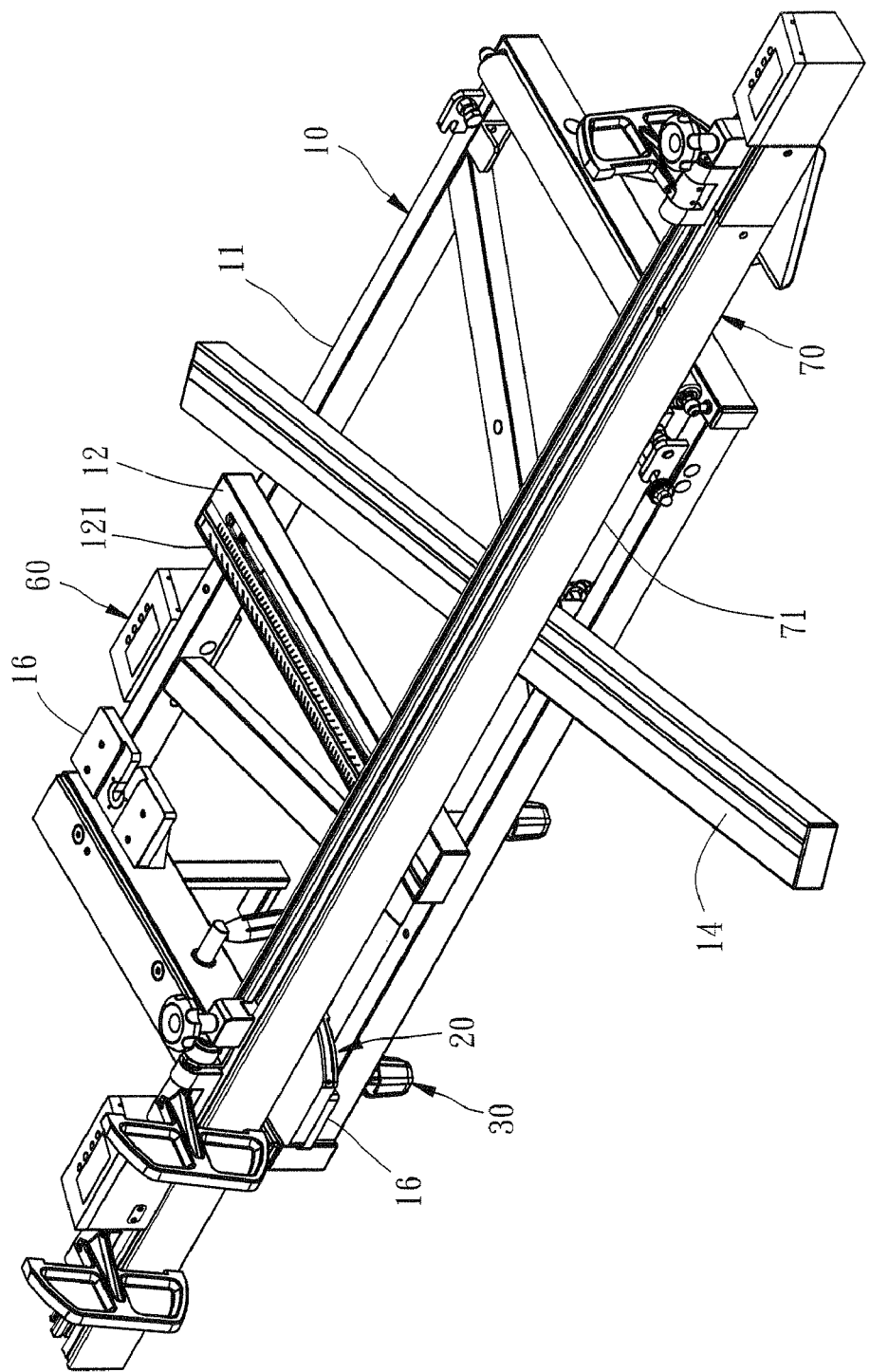
FIG. 1 is an elevational view of a workpiece feeding device for use in a horizontal displacement mechanism of a saw machine according to the present invention.
Figure 2:
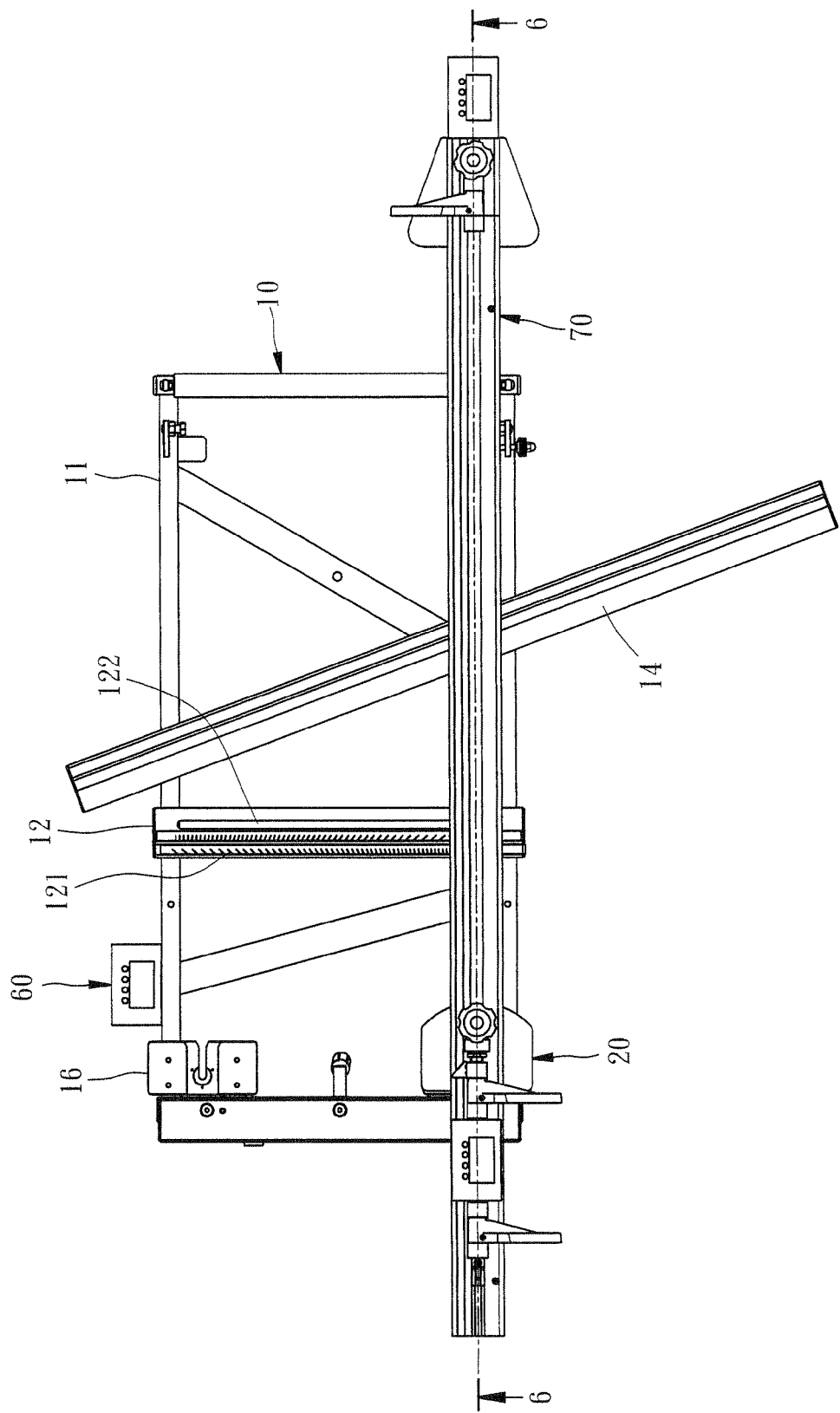
FIG. 2 is a top view of FIG. 1.
Figure 3:
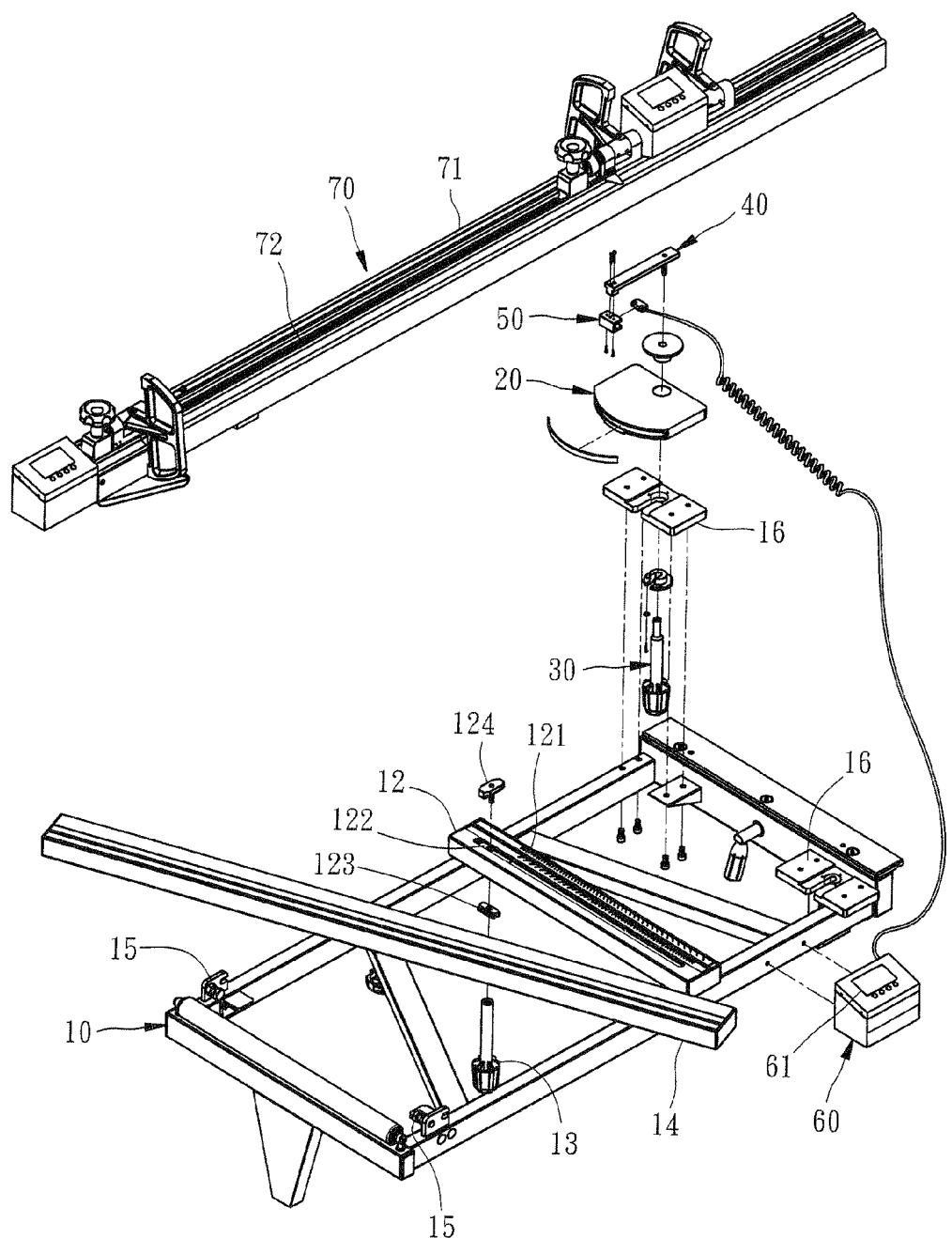
FIG. 3 is an exploded view of FIG. 1.
Figure 4:
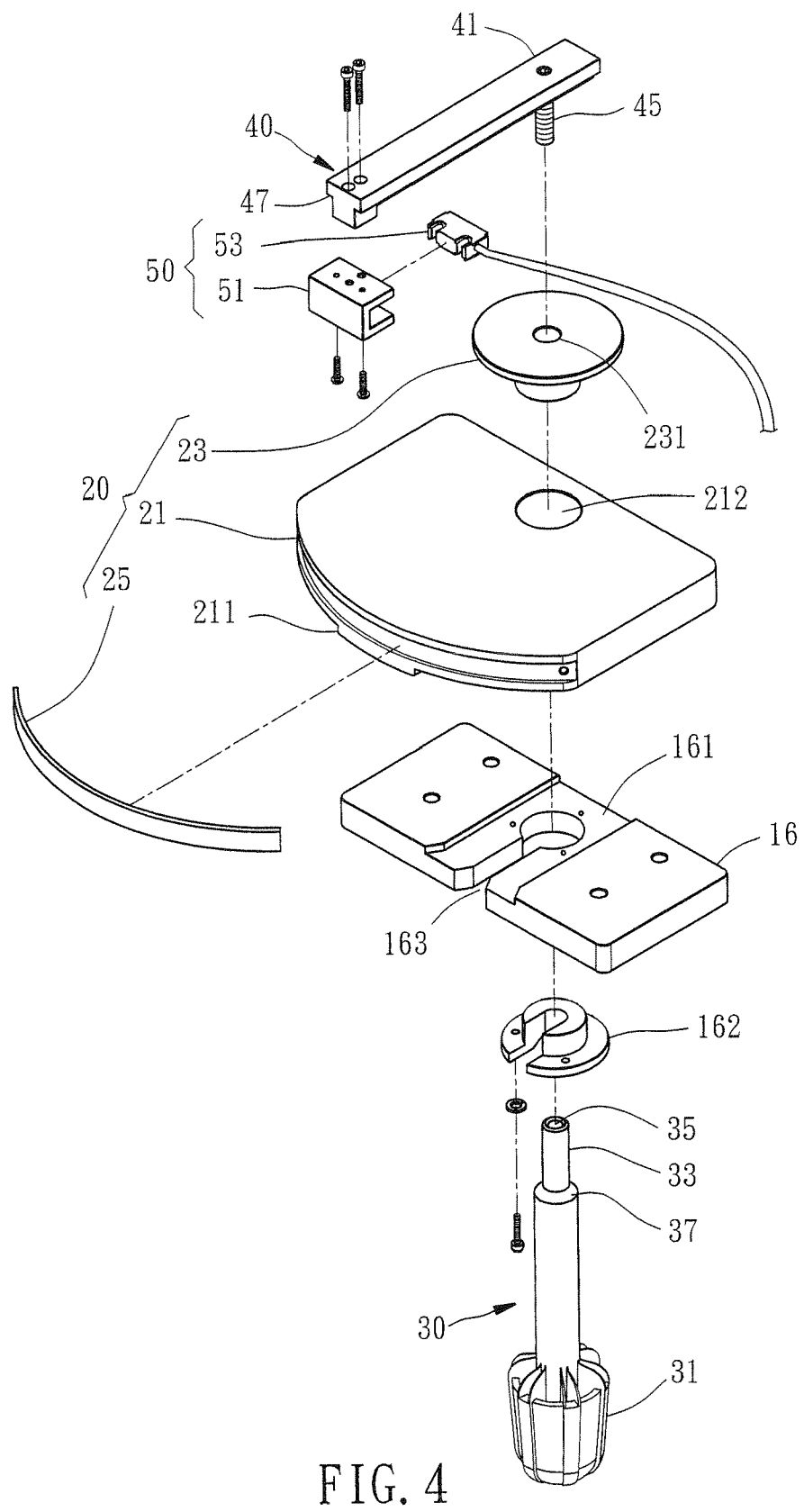
FIG. 4 is an enlarged view of a part of FIG. 3.
Figure 5:
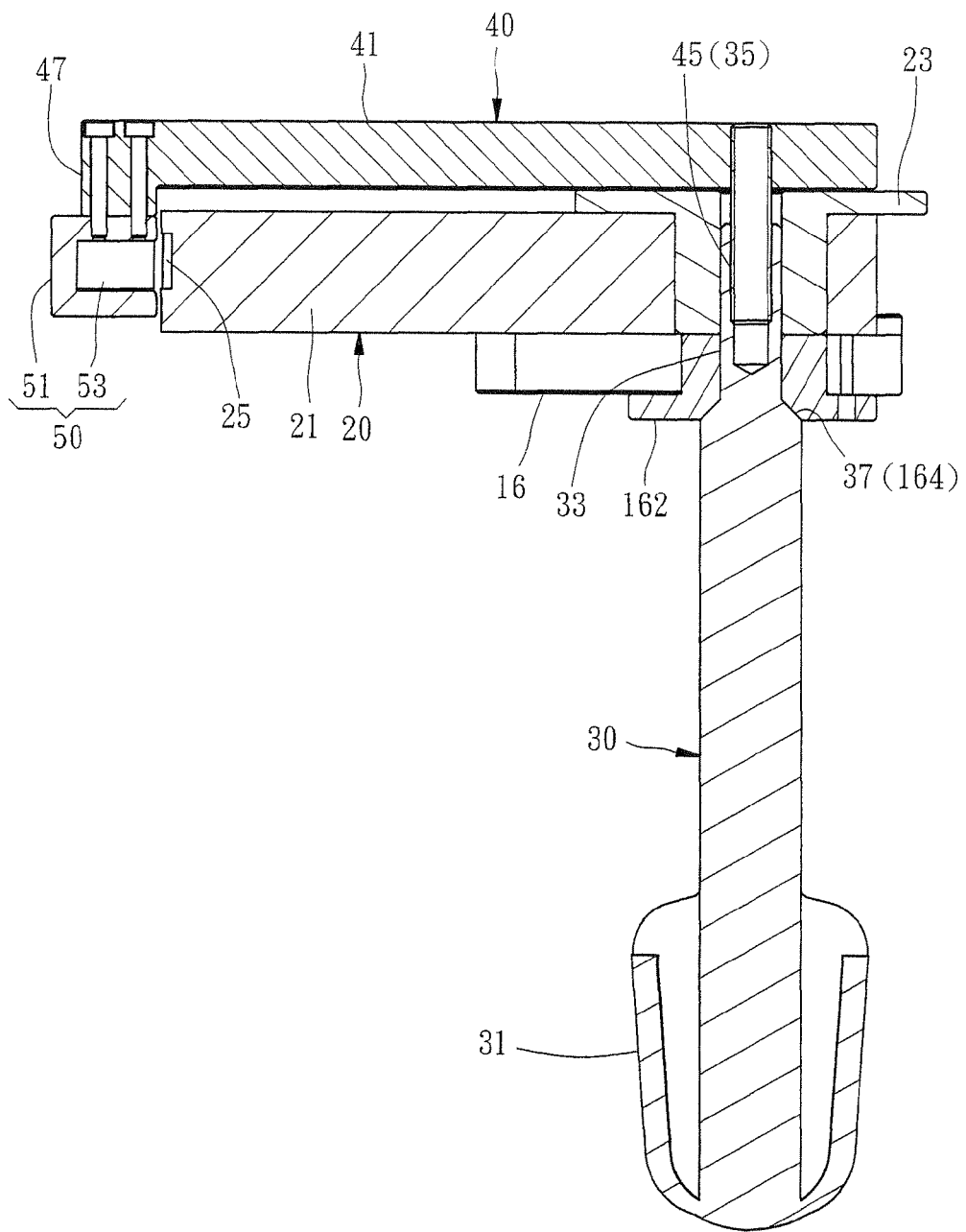
FIG. 5 is a sectional assembly view of a part of the workpiece feeding device according to the present invention.
Figure 6:
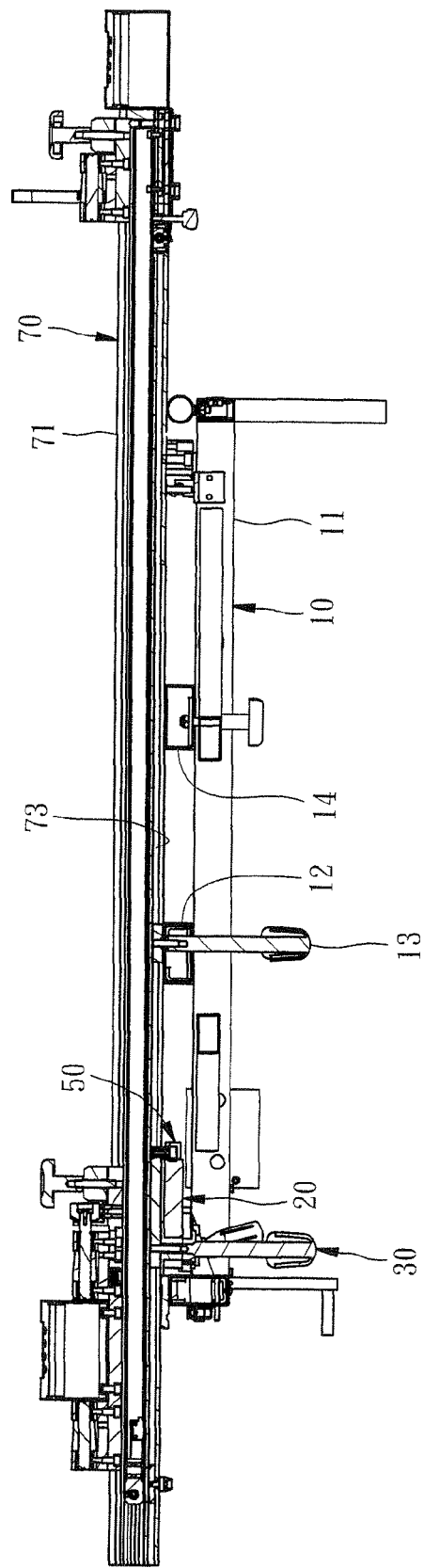
FIG. 6 is a sectional view taken along line 6-6 of FIG. 2.

Referring to FIGS. 1~6, a workpiece feeding device with angle detection means in accordance with the present invention is shown installed in a saw machine (not shown) having a machine base and a saw blade mounted in the machine base. The workpiece feeding device comprises:

a carrier 10, which comprises a base frame 11 provided at one side of the machine base of the saw and horizontally movable relative to the machine base, an angle scale 12 fastened to the base frame 11 at the top with screws and having angle graduations 121 marked thereon and a longitudinal slot 122 cut therethrough, a first guide block 123 mounted in the longitudinal slot 122 of the angle scale 12, a second guide block 124 inserted through the first guide block 123, a locating bolt 13 fastened to the second guide block 124, a supplementary frame bar 14 mounted on the base frame 11 at the top and kept in flush with the top surface of the angle scale 12, two calibration bolts 15 bilaterally mounted on the base frame 11 and disposed near one end of the base frame 11, two locating plates 16 bilaterally mounted on the base frame 11 and disposed near the other end of the base frame 11, each locating plate 16 having a coupling groove 161 mounted with bushing 162 and defining an opening 163 and a beveled edge 164 around the opening 163;

a magnetic plate assembly 20, which comprises a plate member 21 that has its one side edge smoothly arched and a coupling flange 211 downwardly extended from the smoothly arched side edge and a through hole 212 cut through the top and bottom walls thereof, a bushing 23 mounted in the through hole 212 of the plate member 21 and defining an axial through hole 231, and a magnetic strip 25 fastened to the smoothly arched side edge of the plate member 21;

a lock bolt 30, which comprises a knob 31 located on its one end, an extension rod 33 forwardly extending from its other end, a screw hole 35 formed in the free end of the extension rod 33, and a holding down portion 37 extending around the root of the extension rod 33;

a suspension arm 40, which comprises a narrow elongated arm body 41, a screw rod 45 perpendicularly located on one end of the arm body 41 and inserted into the through hole 231 of the bushing 23 of the magnetic plate assembly 20 and threaded into the screw hole 35 of the lock bolt 30, and a guide block 47 located on the other end of the arm body 41 and having a T-shaped profile;

a magnetic sensor 50, which comprises a substantially U-shaped clamping plate 51 affixed to the guide block 47 of the suspension arm 40 and a magnetic sensor element 53 fastened to the clamping plate 51 with screws;

a display unit 60, which is mounted in the base frame 11 of the carrier 10 and, which comprises an electric circuit module (not shown) that is electrically connected with the magnetic sensor element 53 of the magnetic sensor 50 and provides a magnetic displacement measurement function, and a display module 61 for indicating the displacement data measured by the electric circuit module; and a fence unit 70, which comprises a rip fence 71 mounted on the base frame 11 of the carrier 10, a length scale 72 located on the top side of the rip fence 71, a sliding groove 73 of a T-shaped profile located on the bottom side of the rip fence 71 for receiving the guiding sliding movement of the guide block 47 of the suspension arm 40 to guide sliding movement of the suspension arm 40.

The installation of the present invention is outlined thereinafter with reference to FIGS. 5 and 6 again, the second guide block 124 of the carrier 10 is inserted into the sliding groove 73 of the fence unit 70 and the locating bolt 13 fastened to the second guide block 124 such that when the rip fence 71 of the fence unit 70 is moved relative to the angle scale 12, the position of the rip fence 71 is changed relative to the angle graduations 121 of the angle scale 12, and a relative biasing angle is thus indicated.

Thereafter, the magnetic sensor 50 is fastened to the suspension arm 40, and then the screw rod 45 of the suspension arm 40 is inserted into the through hole 231 of the bushing 23 of the magnetic plate assembly 20 and threaded into the screw hole 35 of the lock bolt 30. At this time, the magnetic sensor element 53 of the magnetic sensor 50 is spaced from the magnetic strip 25 of the magnetic plate assembly 20 at a predetermined distance so that the magnetic sensor element 53 detect the magnetic force of the magnetic strip 25, and there is a predetermined gap left between the holding down portion 37 of the lock bolt 30 and the coupling flange 211 of the magnetic plate assembly 20.

Thereafter, the guide block 47 of the suspension arm 40 is coupled to the sliding groove 73 of the fence unit 70, allowing movement of the suspension arm 40, the magnetic plate assembly 20 and the lock bolt 30 along the sliding groove 73 of the fence unit 70. Therefore, after installation of the fence unit 70 in one of the two locating plates 16 of the carrier 10, the extension rod 33 of the lock bolt 30 can be moved into the opening 163 of the locating plate 16, i.e., the lock bolt can be moved axially through a predetermined distance and then moved transversely into or away from the opening of the locating plate between the locking position and the unlocking position. Further, the coupling flange 211 of the plate member 21 of the magnetic plate assembly 20 is coupled to the coupling groove 161 of the locating plate 16, and then rotate the knob 31 of the lock bolt 30 to force the holding down portion 37 into engagement with the beveled edge 164 of the respective locating plate 16, allowing the suspension arm 40 to be turned relative to the magnetic plate assembly 20.

The principle and operation procedure of the present invention are explained hereinafter. When biasing the fence unit 70 relative to the coupled locating plate 16, the rip fence 71 is moved above the angle scale 12 and the supplementary frame bar 14 to turn the suspension arm 40 about the screw rod 45. At this time, the magnetic sensor 50 detects a change of the value of magnetic induction relative to the magnetic strip 25 of the magnetic plate assembly 20 and sends the detection result to the circuit module of the display unit 60, enabling the circuit module of the display unit 60 to calculate the amount of angular displacement and display the calculated value on display module 61.

Further, after installation of the fence unit 70 in one of the two locating plates 16 of the carrier 10, the angular position (90-degrees angular position) of the fence unit 70 relative to the angle scale 12 and the angular position (90-degrees angular position) of the magnetic sensor 50 relative to the magnetic plate assembly 20 can be calibrated based on the reference of the calibration bolt 15. Further, the fence unit 70 can be biased inwards within the range of 90-degrees to 45-degrees to adjust the cutting angle of the workpiece.

Still further, when wishing to change the position of the fence unit 70 on the carrier 10, loosen the lock bolt 30, and then move the magnetic plate assembly 20 and the lock bolt 30 away from the corresponding locating plate 16, and then couple the magnetic plate assembly 20 to the other locating plate 16, and then fasten tight the lock bolt 30 to lock the fence unit 70. Therefore, it is convenient to mount and dismount the fence unit 70.

Further, axle bearings may be used to substitute for the aforesaid bushings, smoothening biasing of the suspension arm relative to the magnetic plate assembly.

By means of using the workpiece feeding device with angle detection means of the present invention in a saw machine, the user can adjust the cutting angle of the workpiece by means of adjusting the biasing angle of the fence unit. By means of reading the angle scale or the indication of the display unit, the user knows the cutting angle accurately, facilitating the sawing operation.

What is claimed is:

1. A workpiece feeding device used in a saw machine, the workpiece feeding device comprising:
   a carrier, said carrier comprising a base frame and being movable, and an angle scale fastened to said base frame;
   a fence unit, said fence unit comprising a rip fence pivotally mounted on said base frame of the carrier and biasable relative to said angle scale;
   a magnetic plate assembly mounted on said base frame of the carrier, said magnetic plate assembly comprising a magnetic strip; and
   a magnetic sensor mounted in said fence unit and spaced from said magnetic strip of the magnetic plate assembly at a predetermined distance, said magnetic sensor being movable with said fence unit to change the angular position thereof relative to said magnetic plate assembly and to measure the angle of said fence unit relative to said angle scale subject to change of magnetic induction between said magnetic sensor and said magnetic strip;
   further comprising a suspension arm mounted on said rip fence of the fence unit to support said magnetic sensor; and
   wherein said rip fence of the fence unit comprises a sliding groove; said suspension arm comprises a guide block coupled to said sliding groove of the rip fence to guide sliding movement of said suspension arm along said sliding groove.

2. A workpiece feeding device used in a saw machine, the workpiece feeding device comprising:
   a carrier, said carrier comprising a base frame and being movable, and an angle scale fastened to said base frame;
   a fence unit, said fence unit comprising a rip fence pivotally mounted on said base frame of the carrier and biasable relative to said angle scale;
   a magnetic plate assembly mounted on said base frame of the carrier, said magnetic plate assembly comprising a magnetic strip; and
   a magnetic sensor mounted in said fence unit and spaced from said magnetic strip of the magnetic plate assembly at a predetermined distance, said magnetic sensor being movable with said fence unit to change the angular position thereof relative to said magnetic plate assembly and to measure the angle of said fence unit relative to said angle scale subject to change of magnetic induction between said magnetic sensor and said magnetic strip;
   further comprising a suspension arm mounted on said rip fence of the fence unit to support said magnetic sensor; and
   wherein said magnetic plate assembly comprises a through hole mounted with a lock bolt; said suspension arm has one end fastened to said lock bolt.

3. The workpiece feeding device as claimed in claim 2, wherein said magnetic plate assembly has a bushing mounted in the through hole thereof to support said lock bolt.

4. The workpiece feeding device as claimed in claim 2, wherein said lock bolt is rotatable to move axially relative to said suspension arm between a locking position to lock said suspension arm to said base frame of the carrier and an unlocking position for enabling said suspension arm to be moved away from said base frame of the carrier.

5. A workpiece feeding device used in a saw machine, the workpiece feeding device comprising:
- a carrier, said carrier comprising a base frame and being movable, and an angle scale fastened to said base frame;
- a fence unit, said fence unit comprising a rip fence pivotally mounted on said base frame of the carrier and biasable relative to said angle scale;
- a magnetic plate assembly mounted on said base frame of the carrier, said magnetic plate assembly comprising a magnetic strip;
- a magnetic sensor mounted in said fence unit and spaced from said magnetic strip of the magnetic plate assembly at a predetermined distance, said magnetic sensor being movable with said fence unit to change the angular position thereof relative to said magnetic plate assembly and to measure the angle of said fence unit relative to said angle scale subject to change of magnetic induction between said magnetic sensor and said magnetic strip; and
- wherein said carrier further comprises a locating plate fixedly fastened to said base frame for the mounting of said magnetic plate assembly.

6. The workpiece feeding device as claimed in claim 5, wherein there are two locating plates fastened to said base frame at spaced locations for the mounting of said magnetic plate assembly selectively.

7. A workpiece feeding device used in a saw machine, the workpiece feeding device comprising:
- a carrier, said carrier comprising a base frame and being movable, and an angle scale fastened to said base frame;
- a fence unit, said fence unit comprising a rip fence pivotally mounted on said base frame of the carrier and biasable relative to said angle scale;
- a magnetic plate assembly mounted on said base frame of the carrier, said magnetic plate assembly comprising a magnetic strip;
- a magnetic sensor mounted in said fence unit and spaced from said magnetic strip of the magnetic plate assembly at a predetermined distance, said magnetic sensor being movable with said fence unit to change the angular position thereof relative to said magnetic plate assembly and to measure the angle of said fence unit relative to said angle scale subject to change of magnetic induction between said magnetic sensor and said magnetic strip; and
- wherein said carrier further comprises a calibration bolt for calibrating 90-degrees angular position of said fence unit.

* * * * *